United States Patent
Sheik-Bahae

(10) Patent No.: US 7,627,017 B2
(45) Date of Patent: Dec. 1, 2009

(54) LASER AMPLIFIER AND METHOD OF MAKING THE SAME

(75) Inventor: Mansoor Sheik-Bahae, Albuquerque, NM (US)

(73) Assignee: STC. UNM, Albuquerque, NM (US)

( * ) Notice: Subject to any disclaimer, the term of this patent is extended or adjusted under 35 U.S.C. 154(b) by 242 days.

(21) Appl. No.: 11/845,367

(22) Filed: Aug. 27, 2007

(65) Prior Publication Data
US 2008/0175292 A1 Jul. 24, 2008

Related U.S. Application Data

(60) Provisional application No. 60/840,276, filed on Aug. 25, 2006, provisional application No. 60/921,754, filed on Apr. 4, 2007.

(51) Int. Cl.
H01S 3/08 (2006.01)
H01S 5/00 (2006.01)
H01S 3/00 (2006.01)

(52) U.S. Cl. .......................... 372/98; 372/92; 372/43.01; 359/333; 359/344

(58) Field of Classification Search ............... 372/43.01, 372/92, 98; 359/333, 344; 257/12, 79, 94
See application file for complete search history.

(56) References Cited

U.S. PATENT DOCUMENTS

| | | | |
|---|---|---|---|
| 5,206,871 A | 4/1993 | Deppe et al. | |
| 5,633,886 A | 5/1997 | Ramdani et al. | |
| 6,646,793 B2 * | 11/2003 | Bruesselbach et al. | 359/342 |
| 6,782,027 B2 | 8/2004 | Cox et al. | |
| 6,891,877 B2 * | 5/2005 | Krause et al. | 372/70 |
| 2002/0080842 A1 | 6/2002 | An et al. | |
| 2004/0081215 A1 | 4/2004 | Johnson et al. | |
| 2004/0218257 A1 | 11/2004 | Chen et al. | |
| 2005/0031011 A1 | 2/2005 | Biard et al. | |
| 2005/0111079 A1 | 5/2005 | Wang et al. | |
| 2005/0185889 A1 * | 8/2005 | Xia et al. | 385/43 |
| 2006/0245463 A1 * | 11/2006 | Hashimoto | 372/96 |

* cited by examiner

Primary Examiner—Minsun Harvey
Assistant Examiner—Phillip Nguyen
(74) Attorney, Agent, or Firm—Kennedy, Ltd.

(57) ABSTRACT

The present invention includes a laser amplifier and a method of making the same. The laser amplifier of the present invention includes a gain medium layer having a first index of refraction, and a coupling layer optically coupled to the gain medium. In the various embodiments described herein, the coupling layer can have a second index of refraction less than the first index of refraction. The laser amplifier described herein can also include an evanescent layer disposed between the gain medium and the coupling layer. The evanescent layer can have a third index of refraction less than the second index of refraction. The laser amplifier provides high power, efficient laser resonance through frustrated total internal reflection and total internal reflection while simultaneously providing for the minimization of waste heat in the gain medium layer.

21 Claims, 6 Drawing Sheets

LASER AMPLIFIER AND METHOD OF MAKING THE SAME

CLAIM OF PRIORITY UNDER 35 U.S.C. §119

The present Application for Patent claims priority to provisional application Ser. No. 60/840,276, entitled "Evanescent-Wave-Subcavity Amplifiers and Lasers", filed on Aug. 25, 2006, and to provisional application Ser. No. 60/921,754, entitled "Evanescent-Wave-Subcavity Active Mirror and its Method of Manufacture", Filed on Apr. 4, 2007, both of which are assigned to the assignee hereof and hereby expressly incorporated by reference herein.

BACKGROUND

1. Field of the Present Invention

The present invention relates generally to the field of lasers, and more specifically to the field of high power laser amplifiers and methods of making the same.

2. History of the Related Art

With the invention of solid-state lasers, the design and uses of lasers in consumer applications has risen dramatically. Small and powerful diode lasers are nearly ubiquitous in numerous kinds of consumer electronics, and they are finding still more applications in the fields of medicine, communications, manufacturing, and commercial and defense aerospace. In particular, edge emitting diode lasers have been shown to provide high power optical outputs at high efficiency, leading to their prevalent use in the marketplace.

However, in spite of recent improvements in edge emitting diode laser design, the spatial beam quality of these lasers is relatively poor thereby degrading the source brightness. If operated in a surface emitting geometry, as in vertical cavity surface emitting lasers (VCSEL), good beam quality can be obtained at the expense of low output power due to joule heating at high current densities. To remedy this, optically pumped thin disk semiconductor lasers known as optically pumped vertical external cavity surface emitting lasers (OP-VECSEL) or optically pumped semiconductor lasers (OPSL) have been developed that has shown promise for their greater potential for delivering brightness conversion, narrow linewidth and wavelength tunabilty. In spite of the successes enjoyed by OP-VECSEL systems, they have a number of disadvantages including the incorporation of relatively thick, expensive and cumbersome dielectric stack mirrors. Moreover, these mirrors will act both as a heating source as well as introducing thermal impedance between the active medium and the heat sink, which in turn can limit the power output of the system as a whole.

Therefore, there is a need in the art for a novel laser cavity and/or laser amplifier that combines ability to deliver brightness conversion, narrow linewidth, and wavelength tunabilty. Such an improved laser amplifier should also be operable at high power with minimal waste heat, and should also be adapted for ease of manufacture, packaging, distribution and incorporation into an array of consumer goods.

SUMMARY OF THE PRESENT INVENTION

Accordingly, the present invention includes a laser amplifier that provides high power performance with improved waste heat management within a more compact package. The laser amplifier of the present invention includes a gain medium layer having a first index of refraction, and a coupling layer optically coupled to the gain medium. In the laser amplifier described below, the coupling layer has a second index of refraction less than the first index of refraction. The laser amplifier described herein also includes an evanescent layer disposed between the gain medium and the coupling layer. The evanescent layer can have a third index of refraction less than the second index of refraction.

In operation of the laser amplifier, the gain medium, coupling layer and evanescent layer are arranged such that light entering the coupling layer at a predetermined angle is transmittable into the evanescent layer and from the evanescent layer into the gain medium through frustrated total internal reflection. The light within the gain medium can be amplified in a subcavity formed through total internal reflection on the back side and frustrated total internal reflection on the front side nearest the evanescent layer. At least a portion of the amplified light can then exit the gain medium through the evanescent layer into a larger laser cavity, for example.

The present invention also includes a method of manufacturing a laser amplifier including the steps of preparing a coupling layer having a first index of refraction; depositing an evanescent layer on the coupling layer, the evanescent layer having a second index of refraction less than the first index of refraction; and depositing a gain medium layer on the evanescent layer, the gain medium layer having a third index of refraction greater than the first index of refraction. In the method described below the first, second, and third indexes of refraction are selected such that light entering the coupling layer at a predetermined angle is at least partially transmitted into the evanescent layer. A portion of the light is transmittable from the evanescent layer into the gain medium through frustrated total internal reflection, and the portion of light is amplifiable within the gain medium sub-cavity.

The present invention further includes a laser cavity incorporating the features of the laser amplifier with an internal and/or external means for reflecting light, such as for example externally placed mirrors. Various features and aspects of the present invention are described in great detail below with reference to the following drawings.

DETAILED DESCRIPTION OF THE PREFERRED EMBODIMENTS

The following description of the preferred embodiments is provided to enable any person skilled in the art to make or use the present invention. Various modifications to these embodiments will be readily apparent to those skilled in the art, and the generic principles defined herein may be applied to other embodiments without departing from the spirit or scope of the invention as set forth in the appended claims.

Figure 1:
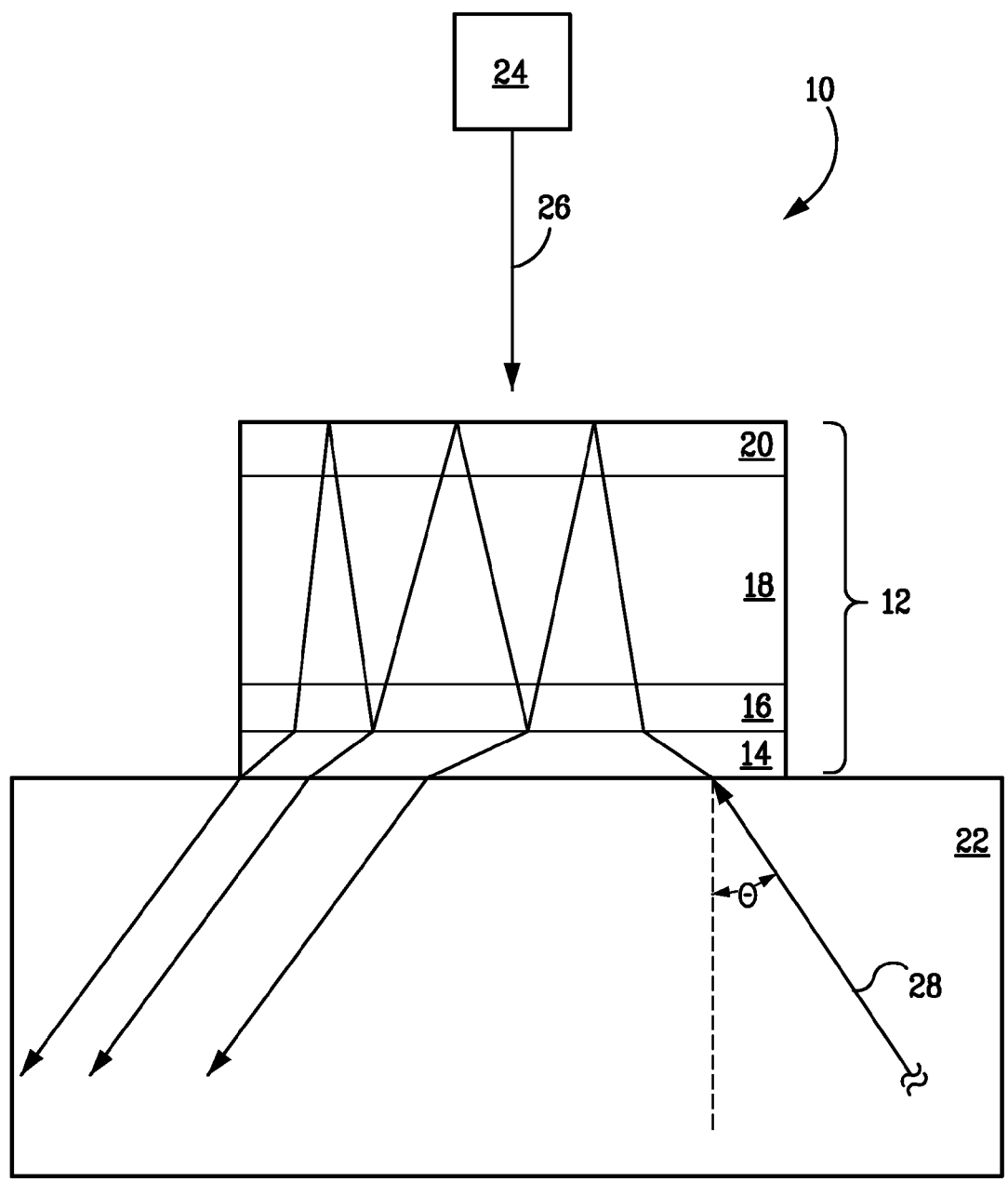
FIG. 1 is a schematic diagram of a laser cavity in accordance with one embodiment of the present invention.

As shown in FIG. 1, a preferred embodiment of the present invention includes a laser amplifier 10 having a gain medium layer 18 having a first index of refraction, and a coupling layer 22 optically coupled to the gain medium. In the laser amplifier 10 of the preferred embodiment, the coupling layer 22 has a second index of refraction less than the first index of refraction. The laser amplifier 10 of the preferred embodiment also includes an evanescent layer 14 disposed between the gain medium and the coupling layer 22. The evanescent layer 14 can have a third index of refraction less than the second index of refraction. In operation, the gain medium 18, coupling layer 22 and evanescent layer 14 are arranged such that a first portion of light 28 entering the coupling layer 22 at a predetermined angle θ is transmittable into the evanescent layer 14 and further such that a second portion of the first portion of light is transmittable from the evanescent layer 14 into the gain medium 18 through frustrated total internal reflection. The second portion of light is amplifiable within the gain medium 18 through total internal reflection on one side of the gain medium 18 and through frustrated total internal reflection on the other side of the gain medium 18 nearest the evanescent layer 14. The amplified light can then exit the gain medium 18 through the evanescent layer 14 in one or more beams or rays of light, as shown in FIG. 1.

In a first variation of the laser amplifier 10 of the preferred embodiment, the laser amplifier 10 also can include an active mirror portion 12 which, in addition to the gain medium layer 18 and the evanescent layer 14, includes a first buffer layer 16 disposed between the gain medium layer 18 and the evanescent layer 14, and a second buffer layer 20 disposed on the gain medium layer 18 opposite the first buffer layer 16. In the first variation of the laser amplifier 10 of the preferred embodiment, the first and second buffer layers 16, have a fourth index of refraction less than the first index of refraction and greater than the second index of refraction, thereby supporting total internal reflection and frustrated total internal reflection of light within the gain medium layer 18. Suitable materials for the first and second buffer layers 16, 20 include for example semiconductor materials having the requisite index of refraction such as indium gallium phosphide.

The gain medium layer 18 functions as a resonant subcavity to amplify the incoming light 28 and return a higher power beam or ray of light, as is known in the art of laser design. Light entering the gain medium layer 18 at a predetermined angle is substantially subject to total internal reflection on one side and frustrated total internal reflection on the other side of the gain medium layer 18 nearest the evanescent layer 14, thereby creating a resonant cavity for laser amplification. The laser amplification can be further stimulated through a pump laser, as described below. Additionally, one skilled in the art of laser design could add one or more external mirrors to the laser amplifier 10 of the preferred embodiment in order to create a laser cavity using the gain medium layer 18 as the laser medium. In a second variation of the laser amplifier 10 of the preferred embodiment, the gain medium layer 18 can be any type of solid-state gain medium. Some exemplary solid-state gain mediums include semiconductors, crystals, glasses or any other active gain medium in which light is amplified through stimulated and/or simultaneous emission of photons. Alternatively, the gain medium layer can be a semiconductor heterostructure, a quantum dot structure, a multiple quantum well structure or any other solid-state active material that satisfies the condition for its refractive index relative to the indexes of refraction of the other materials in the laser amplifier 10.

In a third variation of the laser amplifier 10 of the preferred embodiment, the coupling layer 22 can be any optically transparent or substantially optically transparent medium for transmitting the first portion of light 28 into the evanescent layer 14. In particular, the coupling layer 22 can be any one of diamond, sapphire, zinc sulfide, zinc selenide, germanium, silicon, tin selenide or titanium dioxide. Furthermore, the coupling layer 22 can be shaped in any suitable fashion, including for example a dome lens or prism specially adapted to transmit light into the evanescent layer 14 at a predetermined angle of incidence.

The evanescent layer 14 functions to at least partially transmit light from the coupling layer 22 into the gain medium layer 18 through the creation of evanescent waves or frustrated total internal reflection, and to partially reflect at least a portion of light into the gain medium layer 18 to create the resonant cavity therein. In a fourth variation of the laser amplifier 10 of the preferred embodiment, the evanescent layer 14 can be magnesium fluoride or any other suitable material having a sufficiently low index of refraction for evanescently coupling a sufficient amount of electromagnetic energy into the gain medium layer 18 through frustrated total internal reflection. The evanescent layer 14 can be of any suitable thickness or geometry to perform the desired function of partially coupling the incident light into the gain medium layer 18. In one example embodiment, the evanescent layer 14 can be between 100 and 1000 nanometers in thickness. Alternatively, the evanescent layer 14 can be between 100 and 300 nanometers in thickness, depending on the size, scale, power and geometry of the laser amplifier 10.

As noted above, the gain medium layer 18 functions in part due to the resonance formed by total internal reflection and frustrated total internal reflection. Accordingly, in a fifth variation of the laser amplifier 10 of the preferred embodiment, the predetermined angle at which the first portion of light 28 enters the coupling layer 22 is greater than a critical angle. The term critical angle as used herein is defined as the angle of incidence of light above which total internal reflection can occur. According to this variation of the laser amplifier 10 of the preferred embodiment, the critical angle is measured from an imaginary line normal to a surface of the coupling layer 22 adjacent to the evanescent layer 14.

In a sixth variation of the laser amplifier 10 of the preferred embodiment described below with reference to FIGS. 8 and 9, the laser amplifier 10 can also include a thermal layer (or substrate) 60, 72 disposed on the second buffer layer 20. The thermal layer 60, 72 can have a fifth index of refraction greater than the third index of refraction and less than the second index of refraction. The thermal layer 60, 72 functions to draw heat generated by the gain medium layer 18 away from the gain medium layer 18 while still promoting total internal reflection within the gain medium layer 18. To that end, the thermal layer 60, 72 can be coupled to a heat sink 62, 74 having a predetermined thermal conductivity sufficient to drain heat from the gain medium layer 18. In operation, the thermal layer 60, 72 and the heat sink 62, 74 cooperate ensure efficient and high power operation of the laser amplifier 10 of the preferred embodiment by preventing excessive heat trapping in the gain medium layer 18.

In a seventh variation of the laser amplifier 10 of the preferred embodiment, the laser amplifier 10 can be coupled to a pump laser 24 adapted to transmit laser light 26 into the gain medium layer 18. The pump laser 24 functions to provide the sufficient gain conditions within the gain medium layer 18 such that the gain medium layer 18 will amplify the first portion of light 28 to a beam of sufficient power for use in any particular application. One suitable pump laser 24 includes a diode laser operating at approximately 805 nanometers. Alternatively, the power and/or wavelength of the pump laser 24 can be matched to the gain characteristics of the gain medium layer 18 and/or the desired power and/or wavelength of light that the gain medium layer 18 is selected to amplify.

Other aspects, features and advantages of the laser amplifier 10 of the preferred embodiment are illustrated in the various example configurations of the laser amplifier 10 shown in FIGS. 2 through 9. The gain medium layer 18, evanescent layer 14 and/or the first and second buffer layers 16, 20 can form an active mirror portion 12 of the laser amplifier 10 as shown for example in FIG. 2. In each of the example embodiments of FIGS. 2 through 9, the indexes of refraction of the gain medium layer 18, evanescent layer 14, coupling layer 22 and/or first and second buffer layers 16, 20 are as described above to provide the necessary optical conditions for frustrated total internal reflection and total internal reflection within the active mirror portion 12.

Figure 2:
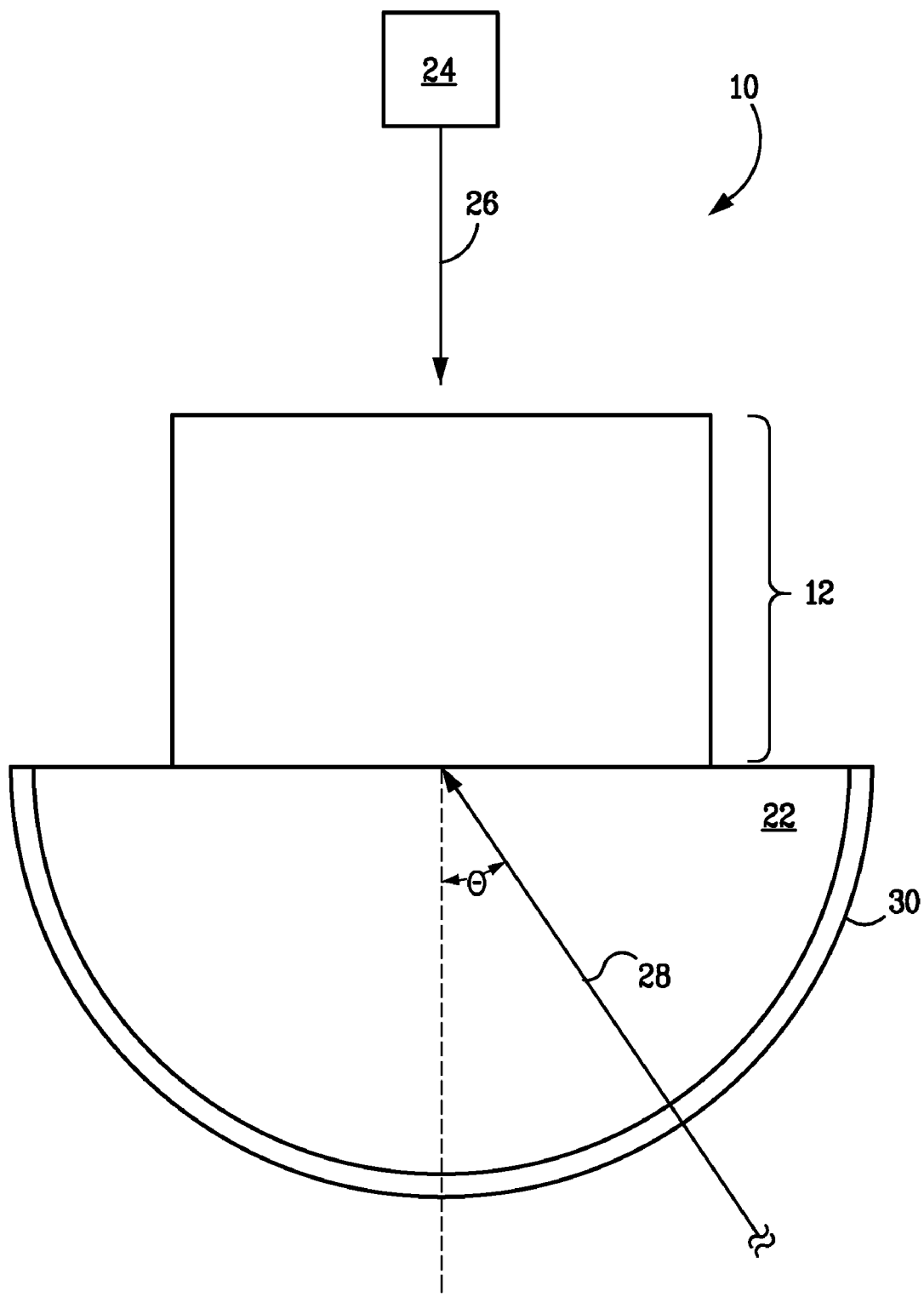
FIG. 2 is a schematic diagram of a laser cavity in accordance with another embodiment of the present invention.

As noted above, the coupling layer 22 can be formed into any suitable shape or geometry for transmitting the first portion of light 28 into the evanescent layer 14. Thus, for example, the coupling layer 22 shown in FIG. 2 is substantially dome-shaped and further includes an anti-reflective coating 30 to ensure maximum transmission of the first portion of light 28 through the coupling layer 22.

Figure 3:
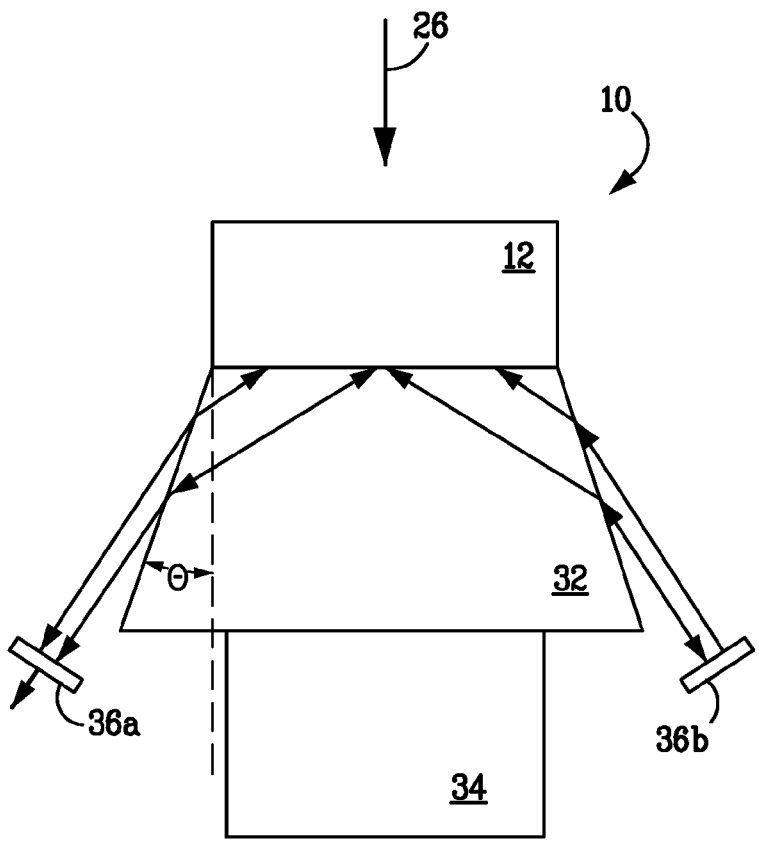
FIG. 3 is a schematic diagram of a laser cavity in accordance with another embodiment of the present invention.

In another example embodiment shown in FIG. 3, the coupling layer 32 is a trapezoidal shape coupled to the active mirror portion 12 and a heat sink 34. The coupling layer 32 defines a top portion nearest the active mirror portion 12 and a base portion nearest the heat sink 34. The angle θ at which the coupling layer 32 expands between the top portion and the base portion can be Brewster's angle, which therefore allows the coupling layer 32 to further function as a polarizer within the laser amplifier 10. Another advantage to the example embodiment shown in FIG. 3 is that since the coupling layer 32 is shaped at Brewster's angle along its outside edge, there is no need to use an anti-reflective coating on the coupling layer 32.

In the example embodiment shown in FIG. 3, the laser amplifier 10 can be coupled to a pair of external mirrors 36a, 36b that function to form an external laser cavity about the active mirror portion 12. The external mirrors 36a, 36b can cooperate to reflect substantially all of the amplified light emanating from the active mirror portion 12 back into the coupling layer 32, with the remaining amplified light being forming the laser beam generated by the laser amplifier 10. In particular, the external mirrors 36a, 36b can be oriented such that substantially all of the light reflected into the coupling layer 32 enters the latter at an angle greater than the critical angle, thereby ensuring that at least a portion of the light reflected by the external mirrors 36a, 36b enters the active mirror portion 12. As in the prior example embodiments, the active mirror portion 12, and in particular the gain medium layer 18, can be pumped by external laser light 26 in order to stimulate the necessary gain conditions for lasing within the laser amplifier 10.

Figure 4:
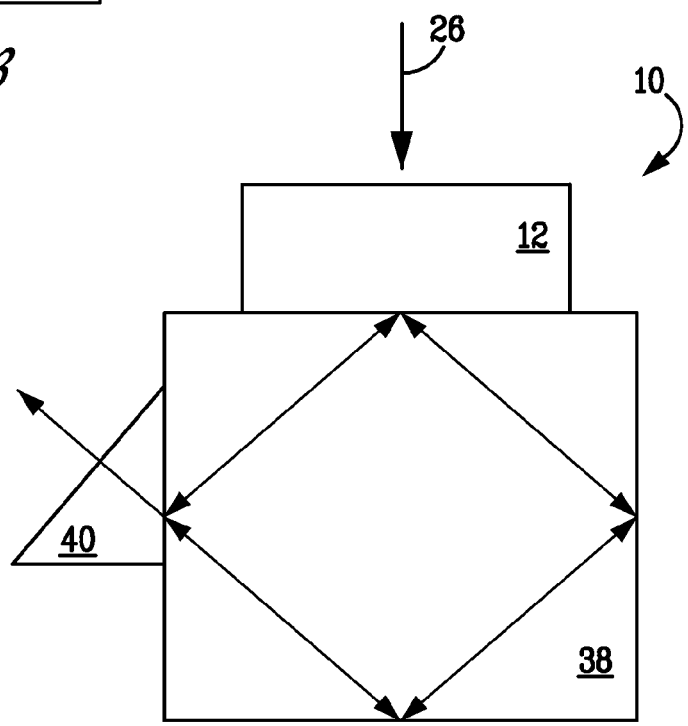
FIG. 4 is a schematic diagram of a laser cavity in accordance with another embodiment of the present invention.

In the example embodiment shown in FIG. 4, the coupling layer 38 can be a substantially rectangular or cube-shaped geometry for total internal reflection of the light generated by the active mirror portion 12, thereby forming a monolithic ring cavity. To that end, the coupling layer 38 can also be coupled to an external prism 40 adapted to transmit a portion of the total internally reflected light into a laser beam generated by the active mirror portion 12. As before, the gain medium layer 18 of the active mirror portion 12 can be pumped by external laser light 26 to stimulate the necessary gain conditions.

Figure 5:
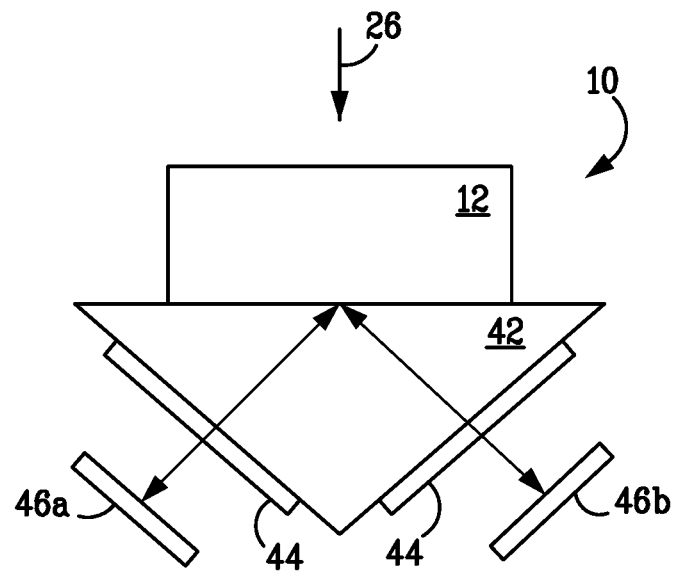
FIG. 5 is a schematic diagram of a laser cavity in accordance with another embodiment of the present invention.

In another example embodiment shown in FIG. 5, the coupling layer 42 can be a prism or pyramid having an anti-reflective coating 44 applied to those surfaces that do not interface with the active mirror portion 12 of the laser amplifier 10. Additionally, the laser amplifier 10 can be coupled to external mirrors 46a, 46b that create an external laser cavity for continuously directing light into the active mirror portion 12 at an angle greater than the critical angle. As previously noted, the active mirror portion 12 of the laser amplifier 10 can be pumped by external laser light 26 to provide the necessary gain conditions therein.

Figure 6:
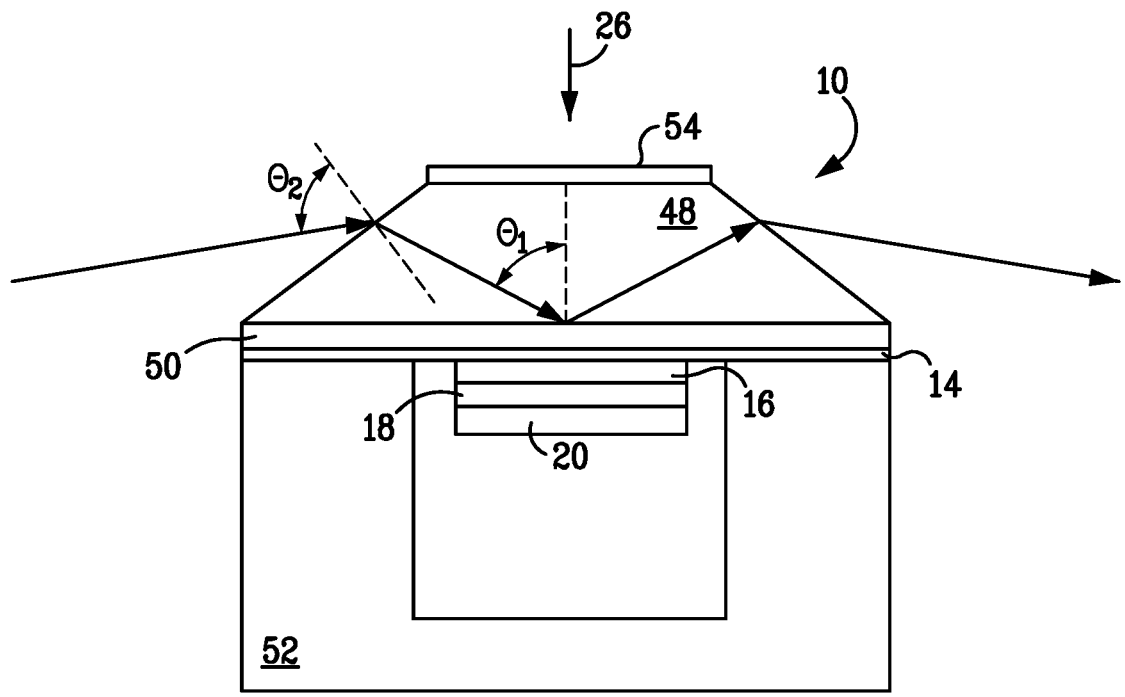
FIG. 6 is a schematic diagram of a laser cavity in accordance with another embodiment of the present invention.

In another example embodiment shown in FIG. 6, the laser amplifier 10 further includes a heat spreading layer 50 disposed between the coupling layer 48 and the evanescent layer 14. The heat-spreading layer 50 can have the necessary index of refraction to ensure complete or substantially complete transmission of light between the coupling layer 48 and the evanescent layer 14. The heat-spreading layer 50 can be composed of diamond or any other suitable material having sufficient thermal conductivity to transport heat away from the evanescent layer 14 and the gain medium layer 18. To that end, the laser amplifier 10 can further include a heat sink 52 coupled, either directly or indirectly, to the heat-spreading layer 50. The heat sink 52 functions to receive heat transmitted by the heat-spreading layer 50 away from the evanescent layer 14 and the gain medium layer 18. As shown in FIG. 6, the heat sink 52 is disposed about the gain medium layer 18 and opposite the pump laser light 26. Alternatively, the heat sink 52 can be disposed in any suitable location and can include any suitable cutouts or geometries for permitting the passage of pump laser light 26 into the gain medium layer 18.

The example laser amplifier 10 of FIG. 6 includes a trapezoid-shaped coupling layer 48 that is oriented with its base adjacent to the heat-spreading layer 50. The example laser amplifier 10 can further include an antireflective coating disposed on the top portion of the coupling layer 48, nearest any incident pump laser light 26. In the configuration shown in FIG. 6, the geometry of the coupling layer 48 is such that light entering the coupling layer 48 on one of its sides at Brewster's angle $\theta_2$ has an angle of incidence $\theta_1$ relative to the heat-spreading layer 50 of approximately 53 degrees, which is an angle sufficient to cause frustrated total internal reflection through the evanescent layer 14 and total internal reflection within the gain medium layer 18. As noted before, because the light enters the coupling layer 48 at an angle of incidence equal to Brewster's angle, there is no need to deposit an anti-reflective coating on the sides of the coupling layer 48.

Figure 7:
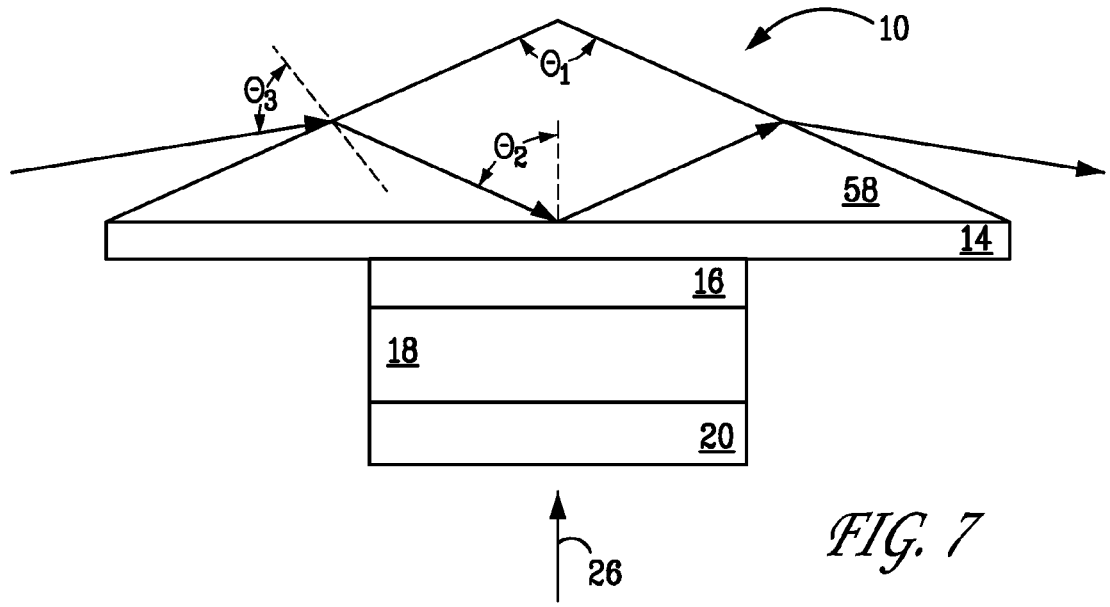
FIG. 7 is a schematic diagram of a laser cavity in accordance with another embodiment of the present invention.

In the example laser amplifier 10 is shown in FIG. 7, the coupling layer 54 is a Brewster prism with an apex angle $\theta_1$ of approximately 123 degrees. Light entering the coupling layer 58 on one of its sides at Brewster's angle $\theta_3$ has an angle of incidence $\theta_2$ relative to the evanescent layer 14 of approximately 52 degrees. As noted in the prior example embodiments, due to the interface between the external light and the coupling layer 58 at Brewster's angle, there is no need to add an anti-reflective coating to the exterior of the coupling layer 58. Testing of the example laser amplifier 10 of FIG. 7 with an 805 nanometer diode pump laser showed that the reflectivity of the p-polarized light is 230 percent for an integrated gain of approximately $10^{-3}$ in the gain medium layer 18. Accordingly, the example laser amplifier 10 is well suited for relatively high-power operation, and can be configured as in other example embodiments with a heat sink to further reduce waste heat.

In the previous example embodiments, the laser amplifier 10 includes an active mirror portion 12, which may include the first and second buffer layers 16, 20, in which gain is achieved through total internal reflection within the gain medium layer 18. In each of these example embodiments, the total internal reflection results as a result in the discrepancy between the index of refraction of the gain medium layer 18 (and/or any buffer layers 16, 20) and an air or vacuum interface. However, as shown in FIGS. 8 and 9, the requisite total internal reflection can also occur as a result of the discrepancy between the gain medium layer 18 (and/or any buffer layers 16, 20) and a thermal layer having an index of refraction less than that of the gain medium layer 18 (and/or any buffer layers 16, 20).

Figure 8:
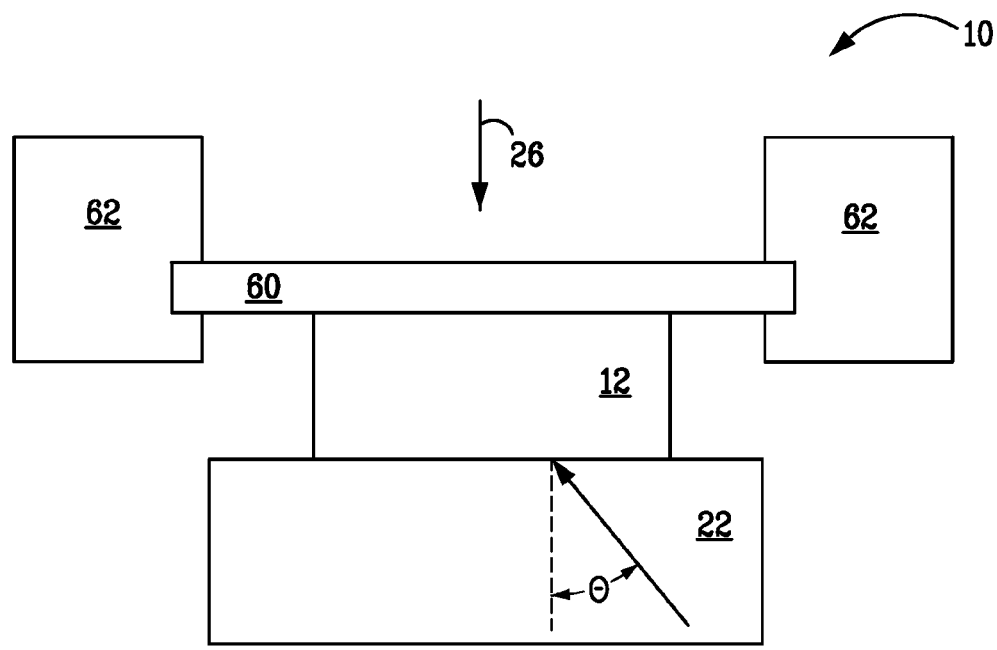
FIG. 8 is a schematic diagram of a laser cavity in accordance with another embodiment of the present invention.

In the example laser amplifier 10 shown in FIG. 8, the active mirror portion 12 is coupled to the coupling layer 22, which may be of any shape or geometry described herein. The active mirror portion 12 is also coupled to a thermal layer 60 disposed opposite the coupling layer 22 such that light entering the active mirror portion 12 through the coupling layer 22 is total internally reflected within the active mirror portion 12 as described above. The thermal layer 60 can be any suitable material, such as diamond for example, that possesses the requisite index of refraction relative to the gain medium layer 18. Moreover, the thermal layer 60 can be selected for its optical transparency such that pump laser light 26 can readily enter the active mirror portion 12 opposite the coupling layer 22. As noted above, the thermal layer 60 can be coupled to one or more heat sinks 62 that function to draw heat through the thermal layer 60 away from the gain medium layer 18 thereby allowing the laser amplifier 10 to operate at higher power with minimal waste heat.

Figure 9:
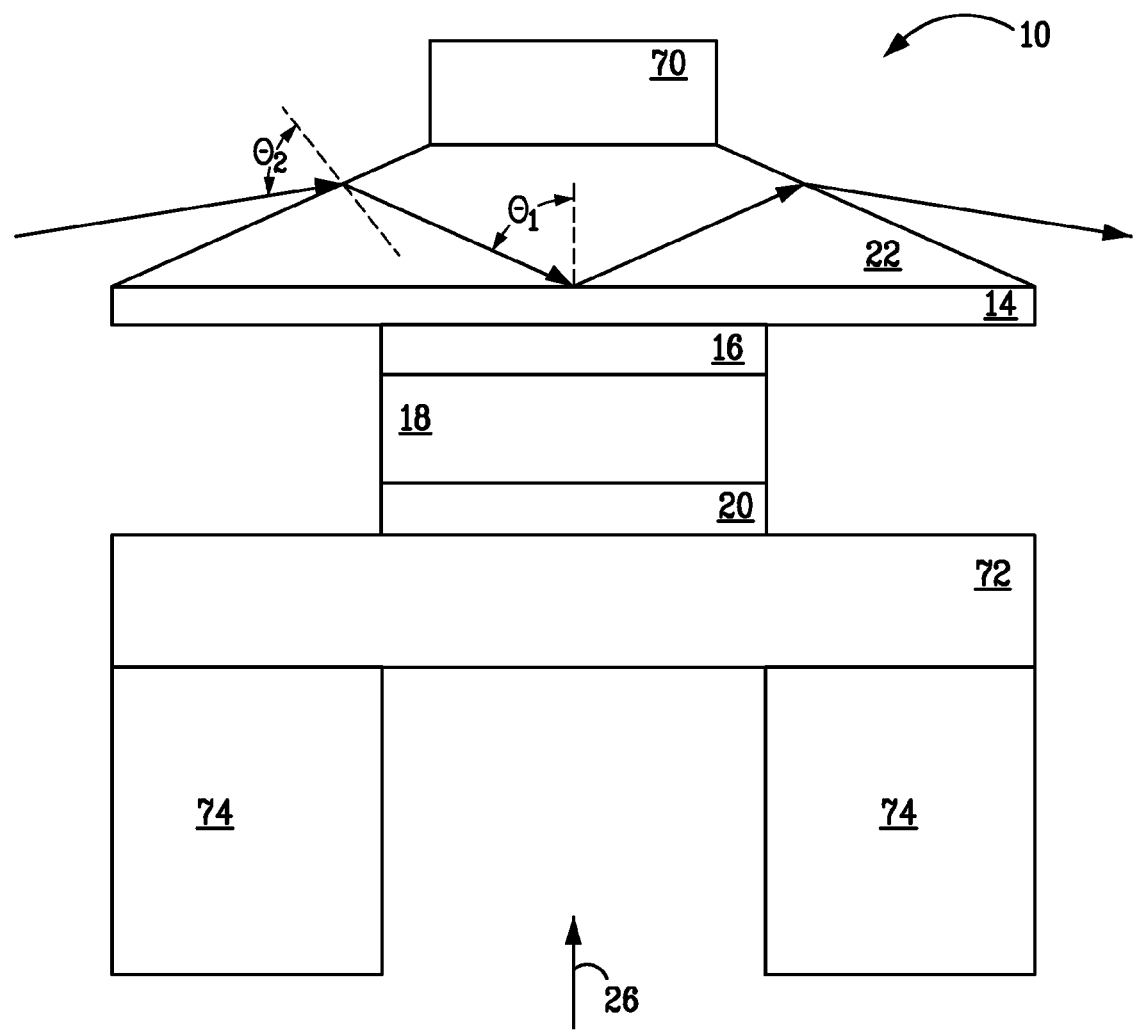
FIG. 9 is a schematic diagram of a laser cavity in accordance with another embodiment of the present invention.

FIG. 9 illustrates another example laser amplifier 10 in which the coupling layer 22 is trapezoid-shaped such that light entering the coupling layer 22 on one of its sides at Brewster's angle $\theta_2$ has an angle of incidence $\theta_1$ relative to the evanescent layer 14 of approximately 53 degrees, which is an angle sufficient to cause frustrated total internal reflection through the evanescent layer 14 and total internal reflection within the gain medium layer 18. In the example embodiment shown in FIG. 9, the laser amplifier 10 further includes a first heat sink 70 disposed on the coupling layer opposite the evanescent layer 14. The example laser amplifier 10 can also include a thermal layer 72 disposed adjacent to the second buffer layer 20. As before, the thermal layer 72 can be any suitable material, such as diamond, that possesses the necessary index of refraction to cause total internal reflection within the gain medium layer 18. Also as noted above, the thermal layer 72 can be optically transparent such that pump laser light 26 can enter into the gain medium layer 18 opposite the coupling layer 22. The thermal layer 72 can be coupled to one or more additional heat sinks 74 that, as described above, function to transfer heat away from the gain medium layer 18 to allow the laser amplifier 10 to operate at higher power with minimal waste heat.

The present invention also includes a method of manufacturing a laser amplifier. In a preferred embodiment, the method includes the steps of preparing a coupling layer having a first index of refraction; depositing an evanescent layer on the coupling layer, the evanescent layer having a second index of refraction less than the first index of refraction; and depositing a gain medium layer on the evanescent layer, the gain medium layer having a third index of refraction greater than the first index of refraction. In the method of the preferred embodiment, the first, second, and third indexes of refraction are selected such that light entering the coupling layer at a predetermined angle is at least partially transmitted into the evanescent layer. Moreover, a portion of the light is transmittable from the evanescent layer into the gain medium through frustrated total internal reflection, and the portion of light is amplifiable within the gain medium through total internal reflection on one side and through frustrated total internal reflection on the other side closer to the evanescent layer.

In a first variation of the method of the preferred embodiment, the method further includes the steps of depositing a first buffer layer between the gain medium layer and the evanescent layer and depositing a second buffer layer on the gain medium layer opposite the evanescent layer. In the first variation of the method of the preferred embodiment, the first and second buffer layers have a fourth index of refraction less than the third index of refraction and greater than the second index of refraction. Suitable materials for the first and second buffer layers include for example semiconductor materials having the requisite index of refraction such as indium gallium phosphide.

The gain medium layer functions as a resonant subcavity to amplify the incoming light and return a higher power beam or ray of light, as noted above. Light entering the gain medium layer at a predetermined angle is substantially subject to total internal reflection on one side of the gain medium layer and frustrated total internal reflection on the side of the gain medium layer nearest the evanescent layer, thereby creating a resonant cavity for laser amplification. The laser amplification can be further stimulated through a pump laser, as described below. Additionally, one skilled in the art of laser design could add one or more external mirrors to the laser amplifier of the preferred embodiment in order to create a laser cavity using the gain medium layer as the laser medium. The gain medium layer can be any type of solid-state gain medium. Some exemplary solid-state gain mediums include semiconductors, crystals, glasses or any other active gain medium in which light is amplified through stimulated and/or simultaneous emission of photons. Alternatively, the gain medium layer can be a semiconductor heterostructure, a quantum dot structure or a multiple quantum well structure.

The coupling layer functions to transmit incoming light into the evanescent layer at a predetermined angle. The coupling layer can be any optically transparent or substantially optically transparent medium for transmitting the first portion of light into the evanescent layer. In particular, the coupling layer can be any one of diamond, sapphire, zinc sulfide, zinc selenide, germanium, silicon, tin selenide or titanium dioxide. Furthermore, the coupling layer can be shaped in any suitable fashion, including for example a dome lens or prism specially adapted to transmit light into the evanescent layer at a predetermined angle of incidence.

The evanescent layer functions to at least partially transmit light from the coupling layer into the gain medium layer through the creation of evanescent waves or frustrated total internal reflection, and to reflect at least a portion of the light back into the gain medium layer through frustrated total internal reflection. In another variation of the method of the preferred embodiment, the evanescent layer can be magnesium fluoride or any other suitable material having a sufficiently low index of refraction for evanescently coupling a sufficient amount of electromagnetic energy into the gain medium layer through frustrated total internal reflection. The evanescent layer can be of any suitable thickness or geometry to perform the desired function of partially coupling the incident light into the gain medium layer. As noted above, the evanescent layer can range between 100 and 1000 nanometers in thickness. Alternatively, the evanescent layer can be between 100 and 300 nanometers in thickness, depending on the size, scale, power and geometry of the laser amplifier.

As noted above, the gain medium layer functions in part due to the resonance formed by total internal reflection and frustrated total internal reflection. Accordingly, in another variation of the method of the preferred embodiment, the predetermined angle at which the first portion of light enters the coupling layer is greater than a critical angle. The term critical angle as used herein is defined as the angle of incidence of light above which total internal reflection can occur. For example, as shown in FIG. 1 the critical angle is measured from an imaginary line normal to a surface of the coupling layer adjacent to the evanescent layer.

In another variation of the method of the preferred embodiment the method can also include the steps of depositing a thermal layer on the second buffer layer. The thermal layer can have a fifth index of refraction greater than the second index of refraction (the evanescent layer) and less than the third index of refraction (the gain medium layer). The thermal layer functions to promote total internal reflection within the gain medium layer and also to draw heat generated by the gain medium layer away from the gain medium layer. An alternative embodiment of the preferred method can include the step of depositing a heat sink in thermal connection with the thermal layer. The heat sink can have a predetermined thermal conductivity sufficient to drain heat from the gain medium layer.

The present invention also includes a laser cavity. In a preferred embodiment, the laser cavity includes a coupling layer adapted to receive light and to transmit at least a first portion of the light entering the coupling layer at a predetermined angle greater than a critical angle. The laser cavity further includes an evanescent layer disposed adjacent to the coupling layer, the evanescent layer adapted to receive the first portion of the light transmitted from the coupling layer and transmit a second portion of the first portion of the light through frustrated total internal reflection. The laser cavity can also include a gain medium layer disposed adjacent to the evanescent layer and opposite the coupling layer, the gain medium layer adapted to receive a third portion of the second portion of light transmitted from the evanescent layer and amplify the third portion of light through total internal reflection within the gain medium layer. The laser cavity can also include means for reflecting light optically coupled to the evanescent layer.

As shown in FIGS. 3, 4 and 5, for example, the means for reflecting can include at least one or more external mirrors for forming an external cavity using the active mirror portion 12 described herein as a resonant subcavity. Alternatively, the means for reflecting can be incorporated into the geometry of the coupling layer as shown in FIG. 4, in which the coupling layer provides a monolithic ring cavity for directing light into the evanescent layer. Additionally, variations of the laser cavity of the preferred embodiment can include for example thermal layers and heat sinks, as described in detail above with reference to the laser amplifier embodiments of the present invention.

The present invention has been described with reference to its preferred embodiments so as to enable any person skilled in the art to make or use the present invention. However, various modifications to these embodiments will be readily apparent to those skilled in the art, and the generic principles defined herein may be applied to other embodiments without departing from the spirit or scope of the invention as set forth in the following claims.

I claim:

1. A laser amplifier comprising:
    a gain medium layer having a first index of refraction;
    a coupling layer optically coupled to the gain medium, the coupling layer having a second index of refraction less than the first index of refraction; and
    an evanescent layer disposed between the gain medium and the coupling layer, the evanescent layer having a third index of refraction less than the second index of refraction such that a first portion of light entering the coupling layer at a predetermined angle is transmittable into the evanescent layer;
    wherein a second portion of the first portion of light is transmittable from the evanescent layer into the gain medium through frustrated total internal reflection, and wherein the second portion of light is amplifiable within the gain medium through total internal reflection.

2. The laser amplifier of claim 1, further comprising a first buffer layer disposed between the gain medium and the evanescent layer, and a second buffer layer disposed on the gain medium opposite the first buffer layer, wherein the first and second buffer layers have a fourth index of refraction less than the first index of refraction and greater than the second index of refraction.

3. The laser amplifier of claim 1, wherein the gain medium layer is a solid-state gain medium.

4. The laser amplifier of claim 3, wherein the gain medium layer is one of a semiconductor heterostructure, a quantum dot structure or a multiple quantum well structure.

5. The laser amplifier of claim 1, wherein the coupling layer is one of diamond, sapphire, zinc sulfide, zinc selenide, germanium, silicon, tin selenide or titanium dioxide.

6. The laser amplifier of claim 1, wherein the evanescent layer comprises magnesium fluoride.

7. The laser amplifier of claim 6, wherein the evanescent layer is between 100 and 1000 nanometers in thickness.

8. The laser amplifier of claim 1, wherein the predetermined angle is greater than a critical angle, the critical angle measured from an imaginary line normal to a surface of the coupling layer adjacent to the evanescent layer.

9. The laser amplifier of claim 2, further comprising a thermal layer disposed on the second buffer layer, the thermal layer having a fifth index of refraction greater than the third index of refraction and less than the second index of refraction.

10. The laser amplifier of claim 9, further comprising a heat sink coupled to the thermal layer, the heat sink having a predetermined thermal conductivity sufficient to drain heat from the gain medium.

11. The laser amplifier of claim 1, further comprising a pump laser adapted to transmit laser light into the gain medium layer.

12. A method of manufacturing a laser amplifier comprising:
    preparing a coupling layer having a first index of refraction;
    depositing an evanescent layer on the coupling layer, the evanescent layer having a second index of refraction less than the first index of refraction; and
    depositing a gain medium layer on the evanescent layer, the gain medium layer having a third index of refraction greater than the first index of refraction;
    wherein the first, second, and third indexes of refraction are selected such that light entering the coupling layer at a predetermined angle is at least partially transmitted into the evanescent layer;
    wherein a portion of the light is transmittable from the evanescent layer into the gain medium through frustrated total internal reflection, and wherein the portion of light is amplifiable within the gain medium through total internal reflection.

13. The method of claim 12, further comprising the steps of depositing a first buffer layer between the gain medium layer and the evanescent layer and depositing a second buffer layer on the gain medium layer opposite the evanescent layer, wherein the first and second buffer layers have a fourth index of refraction less than the third index of refraction and greater than the second index of refraction.

14. The method of claim 12, wherein the gain medium layer is a solid-state gain medium.

15. The method of claim 13, wherein the gain medium layer is one of a semiconductor heterostructure, a quantum dot structure or a multiple quantum well structure.

16. The method of claim 12, wherein the coupling layer is one of diamond, sapphire, zinc sulfide, zinc selenide, germanium, silicon, tin selenide or titanium dioxide.

17. The method of claim 12, wherein the evanescent layer comprises magnesium fluoride.

18. The method of claim 17, wherein the evanescent layer is between 100 and 1000 nanometers in thickness.

19. The method of claim 12, wherein the predetermined angle is greater than a critical angle, the critical angle measured from an imaginary line normal to a surface of the coupling layer adjacent to the evanescent layer.

20. The method of claim 13, further comprising the step of depositing a thermal layer on the second buffer layer, the thermal layer having a fifth index of refraction greater than the second index of refraction and less than the first index of refraction.

21. A laser cavity comprising:
a coupling layer adapted to receive light and to transmit at least a first portion of the light entering the coupling layer at a predetermined angle greater than a critical angle;
an evanescent layer disposed adjacent to the coupling layer, the evanescent layer adapted to receive the first portion of the light transmitted from the coupling layer and transmit a second portion of the first portion of the light through frustrated total internal reflection;
a gain medium layer disposed adjacent to the evanescent layer and opposite the coupling layer, the gain medium layer adapted to receive a third portion of the second portion of light transmitted from the evanescent layer and amplify the third portion of light through total internal reflection within the gain medium layer; and
means for reflecting light optically coupled to the evanescent layer.

* * * * *